United States Patent
Murawski et al.

(10) Patent No.: US 11,660,967 B2
(45) Date of Patent: May 30, 2023

(54) CLOSED-LOOP CONTROL OF REGENERATIVE BRAKING

(71) Applicant: Robert Bosch GmbH, Stuttgart (DE)

(72) Inventors: Evan Murawski, Plymouth, MI (US); Alexander Koenig, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 16/925,745

(22) Filed: Jul. 10, 2020

(65) Prior Publication Data

US 2022/0009354 A1 Jan. 13, 2022

(51) Int. Cl.
*B60L 7/00* (2006.01)
*B60L 7/18* (2006.01)
*B60T 8/17* (2006.01)
*B60T 8/32* (2006.01)

(52) U.S. Cl.
CPC ...... *B60L 7/18* (2013.01); *B60T 8/17* (2013.01); *B60T 8/321* (2013.01); *B60T 2220/04* (2013.01); *B60T 2220/06* (2013.01); *B60T 2240/00* (2013.01); *B60T 2250/00* (2013.01); *B60T 2250/04* (2013.01); *B60T 2270/60* (2013.01)

(58) Field of Classification Search
CPC ...... B60L 7/18; B60L 7/10; B60L 7/22; B60L 3/12; B60L 7/00; B60T 8/17; B60T 8/321; B60T 2220/04; B60T 2220/06; B60T 2240/00; B60T 2250/00; B60T 2250/04; B60T 2270/60
USPC .......................................................... 701/22
See application file for complete search history.

(56) References Cited

U.S. PATENT DOCUMENTS

| | | | | |
|---|---|---|---|---|
| 5,322,352 | A | * | 6/1994 | Ohno ........................ B60L 7/22 303/3 |
| 5,915,801 | A | * | 6/1999 | Taga ........................ B60L 7/18 903/945 |
| 8,892,291 | B2 | | 11/2014 | Nedorezov et al. |
| 9,381,909 | B2 | | 7/2016 | Banker et al. |
| 9,421,976 | B2 | | 8/2016 | Doering et al. |
| 9,707,848 | B2 | * | 7/2017 | Huh ........................ B60L 7/26 |
| 10,065,627 | B2 | | 9/2018 | Oldridge |
| 10,500,975 | B1 | | 12/2019 | Healy |
| 10,507,820 | B2 | * | 12/2019 | Hawley ............. B60W 40/1005 |

(Continued)

*Primary Examiner* — Shardul D Patel
(74) *Attorney, Agent, or Firm* — Michael Best & Friedrich LLP

(57) ABSTRACT

Systems, methods, and vehicles for closed-loop control of regenerative braking. The system includes, in one implementation, a regenerative braking subsystem and a vehicle controller. The vehicle controller is configured to command the regenerative braking subsystem to apply a first amount of regenerative braking torque. The vehicle controller is also configured to determine a current vehicle deceleration while the first amount of regenerative braking torque is applied. The vehicle controller is further configured to determine a difference between the current vehicle deceleration and a target vehicle deceleration. The vehicle controller is also configured to set a second amount of regenerative braking torque to reduce the difference between the current vehicle deceleration and the target vehicle deceleration. The vehicle controller is further configured to command the regenerative braking subsystem to apply the second amount of regenerative braking torque.

19 Claims, 3 Drawing Sheets

(56) References Cited

U.S. PATENT DOCUMENTS

| | | | | |
|---|---|---|---|---|
| 2015/0239393 | A1* | 8/2015 | Aberizk | B60Q 1/302 340/467 |
| 2018/0354368 | A1* | 12/2018 | Gotoh | B60K 6/365 |
| 2019/0193569 | A1* | 6/2019 | Oh | B60W 40/107 |
| 2019/0366993 | A1* | 12/2019 | Park | B60L 7/18 |
| 2020/0361468 | A1* | 11/2020 | Belt | B60K 6/387 |
| 2021/0122371 | A1* | 4/2021 | Choi | B60K 6/387 |
| 2021/0402877 | A1* | 12/2021 | Velazquez Alcantar | B60K 26/02 |

* cited by examiner

CLOSED-LOOP CONTROL OF REGENERATIVE BRAKING

FIELD

The present disclosure relates generally to regenerative braking in vehicles. More specifically, the present disclosure relates to closed-loop control of regenerative braking in vehicles.

BACKGROUND

Friction braking systems in vehicles waste tremendous amounts of energy. For example, with hydraulic braking systems, all of the kinetic energy of a vehicle's momentum is irrecoverably lost to heat from friction. Regenerative braking systems enable recapturing of a portion of the kinetic energy of a vehicle's momentum by converting the kinetic energy to electrical energy that is used to power the vehicle.

SUMMARY

Conventional regenerative braking systems apply regenerative braking in an open-loop fashion. For example, some conventional regenerative braking systems apply a fixed amount of regenerative braking based on accelerator pedal position. It is difficult to quickly and accurately determine variables that affect vehicle deceleration behavior such as vehicle mass. Thus, conventional regenerative braking systems often do not account for these variables in their open-loop control schemes. By not accounting for vehicle mass and other variables that affect vehicle deceleration behavior, conventional open-loop regenerative braking systems provide inconsistent regenerative braking performance that can cause discomfort to the occupants of the vehicle. Further, conventional open-loop regenerative braking systems do not take advantage of the opportunity to recapture additional kinetic energy when the vehicle is heavily loaded with cargo or people.

Thus, the present disclosure provides a system for closed-loop control of regenerative braking in a vehicle. The system includes, in one implementation, a regenerative braking subsystem and a vehicle controller. The vehicle controller is configured to command the regenerative braking subsystem to apply a first amount of regenerative braking torque. The vehicle controller is also configured to determine a current vehicle deceleration while the first amount of regenerative braking torque is applied. The vehicle controller is further configured to determine a difference between the current vehicle deceleration and a target vehicle deceleration. The vehicle controller is also configured to set a second amount of regenerative braking torque to reduce the difference between the current vehicle deceleration and the target vehicle deceleration. The vehicle controller is further configured to command the regenerative braking subsystem to apply the second amount of regenerative braking torque.

The present disclosure also provides a method for closed-loop control of regenerative braking in a vehicle. The method includes applying a first amount of regenerative braking torque with a regenerative braking subsystem of the vehicle. The method also includes determining a current vehicle deceleration while the first amount of regenerative braking torque is applied. The method further includes determining a difference between the current vehicle deceleration and a target vehicle deceleration. The method also includes setting a second amount of regenerative braking torque to reduce the difference between the current vehicle deceleration and the target vehicle deceleration. The method further includes applying the second amount of regenerative braking torque with the regenerative braking subsystem.

The present disclosure further provides a vehicle including, in one implementation, a regenerative braking subsystem and a vehicle controller. The vehicle controller is configured to command the regenerative braking subsystem to apply a first amount of regenerative braking torque. The vehicle controller is also configured to determine a current vehicle deceleration while the first amount of regenerative braking torque is applied. The vehicle controller is further configured to determine a difference between the current vehicle deceleration and a target vehicle deceleration. The vehicle controller is also configured to set a second amount of regenerative braking torque to reduce the difference between the current vehicle deceleration and the target vehicle deceleration. The vehicle controller is further configured to command the regenerative braking subsystem to apply the second amount of regenerative braking torque.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations, and explain various principles and advantages of those implementations.

Figure 1:
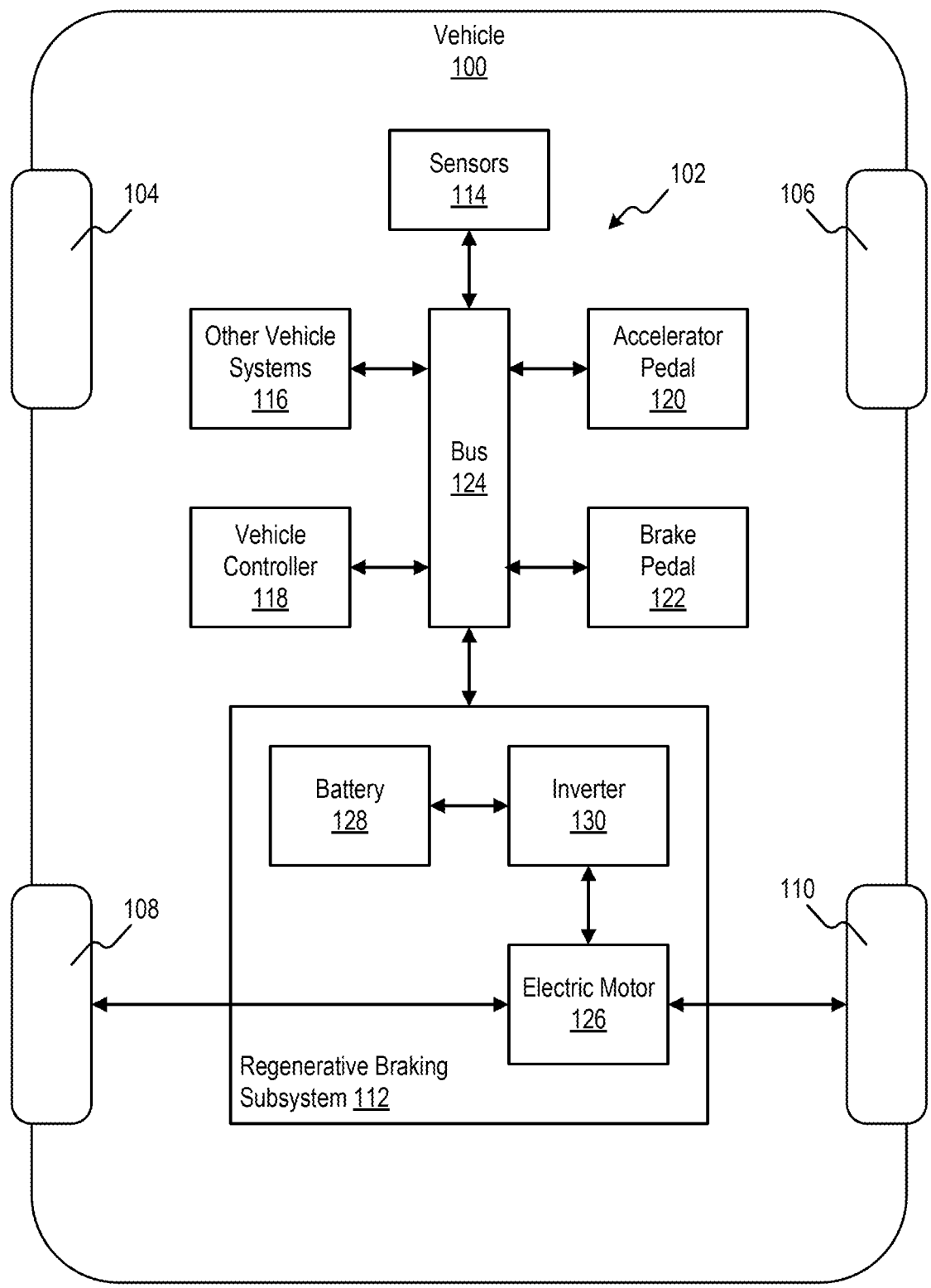
FIG. 1 is a block diagram of one example a vehicle equipped with a system for closed-loop control of regenerative braking, in accordance with some implementations.

The system and method components have been represented where appropriate by conventional symbols in the drawings, showing only those specific details that are pertinent to understanding the implementations so as not to obscure the disclosure with details that will be readily apparent to those of ordinary skill in the art having the benefit of the description herein.

DETAILED DESCRIPTION

FIG. 1 is a block diagram of one example of a vehicle 100 equipped with a system 102 for closed-loop control of regenerative braking. The vehicle 100 illustrated in FIG. 1 includes a front left wheel 104, a front right wheel 106, a rear left wheel 108, a rear right wheel 110. In some implementations, the vehicle 100 is an electric vehicle. In other implementations, the vehicle 100 is a hybrid vehicle that also includes a gasoline-powered engine (not shown). The system 102 illustrated in FIG. 1 includes a regenerative braking subsystem 112, sensors 114, other vehicle systems 116, a vehicle controller 118 (for example, a vehicle control unit), an accelerator pedal 120, and a brake pedal 122.

The components of the system 102, along with other various modules and components are electrically coupled to each other by or through one or more control or data buses (for example, bus 124), which enable communication therebetween. The use of control and data buses for the interconnection between, and communication among, the various modules and components would be known to a person skilled in the art in view of the invention described herein. In some implementations, the bus 124 is a Controller Area Network (CAN™) bus. In some implementations, the bus 124 is an automotive Ethernet™, a FlexRay™ communications bus, or another suitable wired bus. In alternative implementations, some or all of the components of the system 102 may be communicatively coupled using suitable wireless modalities (for example, Bluetooth™ or near field communication). In some implementations, the accelerator pedal 120 and/or the brake pedal 122 communicate with the other components of the system 102 by sending analog voltage signals indicating, for example, pedal position.

For ease of description, the system 102 illustrated in FIG. 1 includes one of each of the foregoing components. Alternative implementations may include one or more of each component or may exclude or combine some components. The vehicle controller 118 (described more particularly below) operates the regenerative braking subsystem 112, the sensors 114, and the other vehicle systems 116 to provide regenerative braking according to the methods described herein.

The regenerative braking subsystem 112 illustrated in FIG. 1 includes an electric motor 126, a battery 128, and an inverter 130. In some implementations, the rear left wheel 108 and the rear right wheel 110 are driven by the electric motor 126 as illustrated in FIG. 1. In other implementations, the rear left wheel 108 and the rear right wheel 110 are driven by separate motors (not shown). In some implementations, the front left wheel 104 and the front right wheel 106 are similarly driven by respective motors (not shown). In some implementations, the electric motor 126 runs on AC (alternating current) power and the battery 128 stores DC (direct current) power. The inverter 130 converts DC power stored in the battery 128 to AC power that is used to by the electric motor 126 to drive the rear left wheel 108 and the rear right wheel 110. In other implementations, the electrical motor 126 runs on DC (direct current) power.

When the vehicle 100 coasts (for example, when the accelerator pedal 120 is disengaged), the regenerative braking subsystem 112 causes the electric motor 126 to act as an electrical generator to covert kinetic energy of the vehicle 100 into AC power. The inverter 130 converts the AC power generated by the electric motor 126 to DC power for storage in the battery 128. The act of generating AC power creates a regenerative braking torque on the electric motor 126 that is transmitted to one or more the wheels (for example, the rear left wheel 108 and the rear right Wheel 110 in order to slow and/or stabilize the vehicle 100. The inverter 130 regulates the amount of regenerative braking torque generated by the electric motor 126.

The regenerative braking subsystem 112 is part of the overall braking system for the vehicle 100 which includes other braking subsystems such as, for example, an ABS (anti-lock brake system). In some implementations, the braking system of the vehicle 100 includes a friction braking subsystem that utilizes frictional braking forces to inhibit the motion of one or more of the wheels of the vehicle 100 in order to slow and/or stop the vehicle 100 (for example, hydraulic brakes and/or air brakes). For example, some or all of the wheels are fitted with brake pads which apply a frictional braking force that inhibits the motion of rotors connected to the wheels.

The sensors 114 determine one or more attributes of the vehicle 100 and communicate information regarding those attributes to the other components of the system 102 using, for example, electrical signals. The vehicle attributes include, for example, the position of the vehicle 100 or portions or components of the vehicle 100, the movement of the vehicle 100 or portions or components of the vehicle 100, the forces acting on the vehicle 100 or portions or components of the vehicle 100, the proximity of the vehicle 100 to other vehicles or objects (stationary or moving), yaw rate, sideslip angle, steering wheel angle, superposition angle, vehicle speed, longitudinal acceleration, and lateral acceleration, and the like. The sensors 114 may include, for example, vehicle control sensors (for example, sensors that detect the position of the accelerator pedal 120, the position of the brake pedal 122, and the position of a steering wheel), wheel speed sensors, vehicle speed sensors, yaw sensors, force sensors, odometry sensors, and vehicle proximity sensors (for example, camera, radar, LIDAR, and ultrasonic). In some implementations, the system 102 includes, in addition to the sensors 114, a GNSS (global navigation satellite system) receiver that determines geo-spatial positioning (i.e., latitude, longitude, altitude, and speed) for the vehicle 100 based on received satellite radiofrequency signals. The vehicle controller 118 may use this information in conjunction with information received from the sensors 114 when controlling the vehicle 100.

The other vehicle systems 116 include controllers, sensors, actuators, and the like for controlling aspects of the operation of the vehicle 100 (for example, steering, acceleration, braking, shifting gears, and the like). The other vehicle systems 116 are configured to send and receive data relating to the operation of the vehicle 100 to and from the regenerative braking subsystem 112 and/or the vehicle controller 118.

Figure 2:
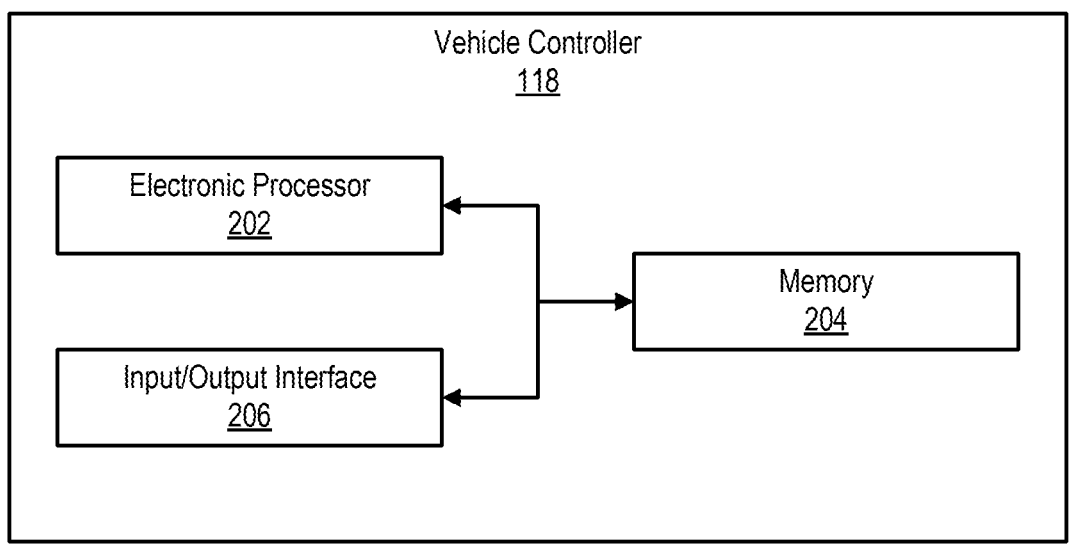
FIG. 2 is a block diagram of one example of a vehicle controller of the system of FIG. 1, in accordance with some implementations.

FIG. 2 is a block diagram of one example of the vehicle controller 118. The vehicle controller 118 illustrated in FIG. 2 includes an electronic processor 202 (for example, one or more microprocessors, application-specific integrated circuit [ASICS], systems-on-a-chip [SoCs], etc.), a memory 204, and an input/output interface 206. The memory 204 may be made up of one or more non-transitory computer-readable media and includes at least a program storage area and a data storage area. The program storage area and the data storage area can include combinations of different types of memory, such as read-only memory (ROM), random access memory (RAM) (for example, dynamic RAM [DRAM], synchronous DRAM [SDRAM], etc.), electrically erasable programmable read-only memory (EEPROM), flash memory, or other suitable memory devices. The electronic processor 202 is coupled to the memory 204 and the input/output interface 206. The electronic processor 202 sends and receives information (for example, from the memory 204 and/or the input/output interface 206), and processes the information by executing one or more software instructions or modules, capable of being stored in the memory 204, or another non-transitory computer readable medium. The software can include firmware, one or more applications, program data, filters, rules, one or more program modules, and other executable instructions. The electronic processor 202 is configured to retrieve from the memory 204 and execute, among other things, software for regenerate braking control, and for performing methods as described herein.

The input/output interface 206 transmits and receives information from devices external to the vehicle controller 118 (for example, over one or more wired and/or wireless connections), for example, components of the system 102 via the bus 124. The input/output interface 206 receives user input, provides system output, or a combination of both. The input/output interface 206 may also include other input and output mechanisms, which for brevity are not described herein and which may be implemented in hardware, software, or a combination of both.

It should be understood that although FIG. 2 illustrates only a single instance of the electronic processor 202, the memory 204, and the input/output interface 206, alternative implementations of the vehicle controller 118 may include multiple processing units, memory modules, and/or input/output interfaces. In some implementations, the vehicle controller 118 is implemented partially or entirely on a semiconductor (for example, a field-programmable gate array [FPGA] semiconductor) chip. In some implementations, the vehicle controller 118 is included in the regenerative braking subsystem 112. For example, the vehicle controller 118 may be included in the inverter 130. In other implementations, the vehicle controller 118 is included in one of the other vehicle systems 116. For example, the vehicle controller 118 may be included in a braking control module or an ABS module.

As noted, open-loop control of regenerative braking torque does not account for variables that affect vehicle deceleration behavior such as vehicle mass. The vehicle controller 118 is configured to perform closed-loop control of regenerative braking torque by actively adjusting regenerative braking torque in order to maintain a target vehicle deceleration. Closed-loop control of regenerative braking based on vehicle deceleration as described herein enables consistent vehicle deceleration behavior without having to directly account for variables such as vehicle mass. In addition, closed-loop control of regenerative braking enables the recapturing of additional kinetic energy when the vehicle 100 is heavier because the regenerative braking torque is increased.

Figure 3:
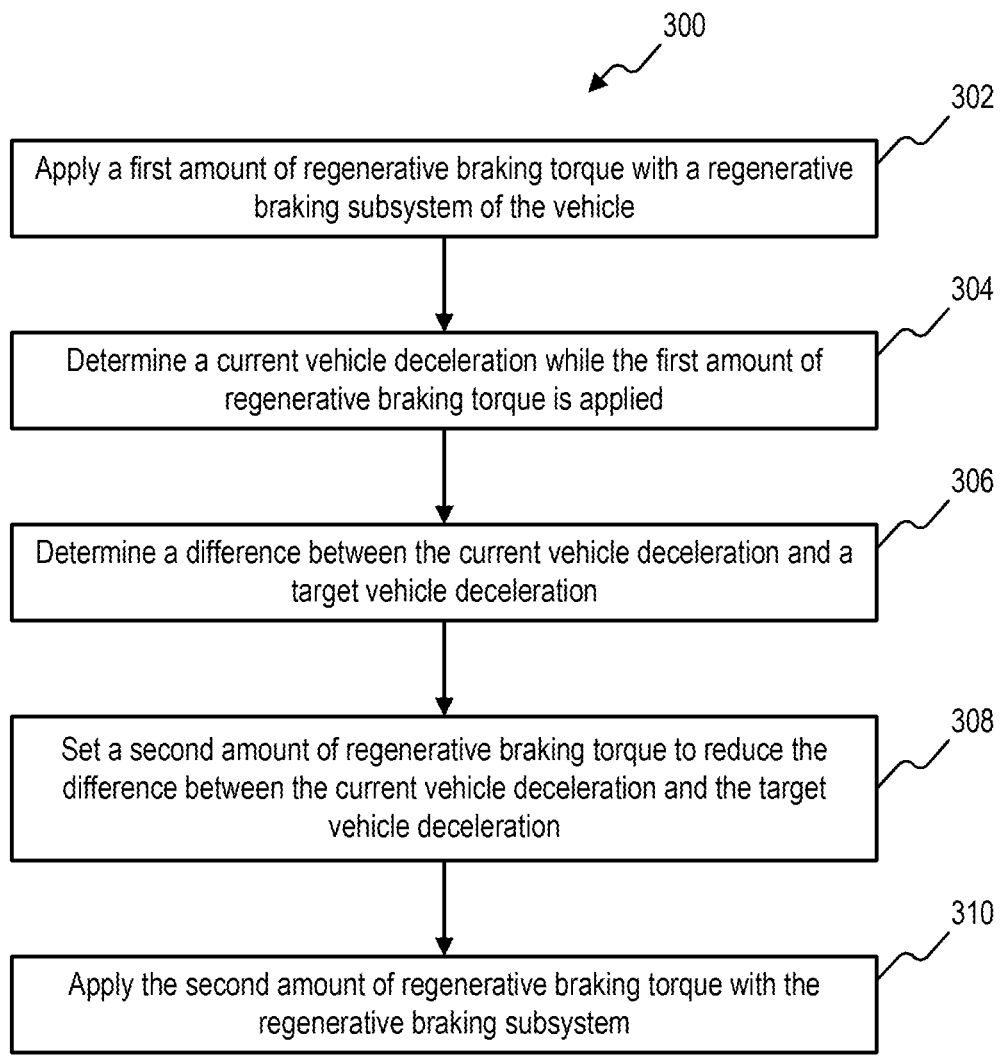
FIG. 3 is flow diagram of one example of a method for closed-loop control of regenerative braking in a vehicle, in accordance with some implementations.

FIG. 3 is a flow diagram of one example of a method 300 for closed-loop control of regenerative braking in the vehicle 100. Although the method 300 is described in conjunction with the system 102 as described herein, the method 300 could be used with other systems and vehicles. In addition, the method 300 may be modified or performed differently than the specific example provided. As an example, the method 300 is described as being performed by the vehicle controller 118 and the regenerative braking subsystem 112. However, it should be understood that in some implementations, portions of the method 300 may be performed by other devices or subsystems of the system 102.

At block 302, the regenerative braking subsystem 112 applies a first amount of regenerative braking torque. For example, the inverter 130 sends power signals to the electric motor 126 which cause the electric motor 126 to generate an amount of electrical power that results in the first amount of regenerative braking torque being transmitted to one or more of the wheels. In some implementations, the vehicle controller 118 sends control signals to the regenerative braking subsystem 112 indicating the first amount of regenerative torque. In some implementations, the regenerative braking subsystem 112 is configured to apply the first amount of regenerative braking torque responsive to receiving a control signal indicating a release of the accelerator pedal 120 (i.e., when the vehicle 100 starts to coast). For example, the vehicle controller 118 (or the regenerative braking subsystem 112) may receive data signals from the accelerator pedal 120 (or from one or more sensors 114) indicating that the pedal position is less than a threshold percentage of the maximum engagement range (for example, less than a threshold of 10%).

At block 304, a current vehicle deceleration is determined while the first amount of the regenerative braking torque is applied. In some implementations, the vehicle controller 118 determines the current vehicle deceleration based on data signals from one or more sensors 114 that detects the current vehicle deceleration (for example, an accelerometer). Alternatively, or in addition, the vehicle controller 118 determines the current vehicle deceleration based on the change in vehicle speed over time as determined by a plurality of vehicle speeds measurements. In some implementations, the vehicle controller 118 receives data signals from one or more sensors 114 indicating the current vehicle speed (for example, wheel speed sensors, motor speed sensors, and the like). Alternatively, or in addition, the vehicle controller 118 receives data signals from one or more of the other vehicle systems 116 indicating the current vehicle speed. As a first example, an ABS module may determine the current vehicle speed based on data signals receiving from one or more wheel speed sensors. As a second example, a GNSS receiver may determine the current vehicle speed based on the change in vehicle position over time.

At block 306, a difference between the current vehicle deceleration and a target vehicle deceleration is determined. For example, the vehicle controller 118 determines whether the current vehicle deceleration is greater than, less than, or equal to the target vehicle deceleration. Examples for determining the target vehicle deceleration are described further below. At block 308, a second amount of regenerative braking torque is set to reduce the difference between the current vehicle deceleration and the target vehicle deceleration. For example, in some implementations, the vehicle controller 118 is configured to set the second amount of regenerative braking torque to be higher than the first amount of regenerative braking torque when the current vehicle deceleration is lower than the target vehicle deceleration, and set the second amount of regenerative braking torque to be lower than the first amount of regenerative braking torque when the current vehicle deceleration is higher than the target vehicle deceleration. In some implementations, the vehicle controller 118 is configured to set the second amount of regenerative braking torque equal to the first amount of regenerative braking torque when the difference between the current vehicle deceleration and the target deceleration is below a threshold. For example, the difference between the current vehicle deceleration and the target deceleration may be so small that adjusting the regenerative braking torque will not lower this difference any further.

At block 310, the second amount of regenerative braking torque is applied with the regenerative braking subsystem 112. For example, the inverter 130 sends control signals to the electric motor 126 which cause the electric motor 126 to generate an amount of electrical power that results in the second amount of regenerative braking torque being transmitted to one or more of the wheels. In some implementations, the vehicle controller 118 sends control signals to the regenerative braking subsystem 112 indicating the second amount of regenerative torque.

In some implementations, the method 300 is cyclical and returns to block 304 to determine a new (or updated) current vehicle deceleration while the second amount of regenerative braking torque is applied. For example, the vehicle controller 118 may be configured to continuously (or intermittingly) adjust the amount of regenerative braking torque applied by the regenerative braking subsystem 112 to minimize the difference between the current vehicle deceleration and the target vehicle deceleration.

In some implementations, the vehicle controller 118 sets the target vehicle deceleration based at least in part on a position of the accelerator pedal 120. For example, the vehicle controller 118 may increase the target vehicle deceleration as the position of the accelerator pedal 120 decreases toward its resting position. In some implementations, the vehicle controller 118 uses a look-up table stored in the memory 204 to determine the target vehicle deceleration based on the position of the accelerator pedal 120. The look-up table may include other input variables such as vehicle speed.

Alternatively, or in addition, in some implementations, the vehicle controller 118 sets the target vehicle deceleration based at least in part on a position of the brake pedal 120. For example, the vehicle controller 118 may increase the target vehicle deceleration as the position of the accelerator pedal 120 increases away from its resting position.

Alternatively, or in addition, in some implementations, the vehicle controller 118 sets the target vehicle deceleration to prevent a brake light (i.e., stop lamp) of the vehicle 100 from illuminating when the vehicle 100 is coasting. Many countries require that the vehicle's brake light must be illuminated when the vehicle is decelerating beyond a threshold vehicle deceleration (for example, beyond $-1.3$ m/s$^2$). Thus, in some implementations, the vehicle controller 118 sets the target vehicle deceleration to be less than the threshold vehicle deceleration at which the brake light illuminates.

Alternatively, or in addition, in some implementations, the vehicle controller 118 sets the target vehicle deceleration based on a braking intervention. As a first example, a track control module of the vehicle 100 may determine that a braking intervention is needed to address a detected exterior road condition. As a second example, an ABS module of the vehicle 100 may determine that a braking intervention is needed to address a wheel slippage condition.

Various aspects of the present disclosure may take any one or more of the following exemplary configurations (ECs).

EC(1) A system for closed-loop control of regenerative braking in a vehicle, the system comprising: a regenerative braking subsystem; a vehicle controller configured to: command the regenerative braking subsystem to apply a first amount of regenerative braking torque, determine a current vehicle deceleration while the first amount of regenerative braking torque is applied, determine a difference between the current vehicle deceleration and a target vehicle deceleration, set a second amount of regenerative braking torque to reduce the difference between the current vehicle deceleration and the target vehicle deceleration, and command the regenerative braking subsystem to apply the second amount of regenerative braking torque.

EC(2) The system of EC(1), wherein the vehicle controller is further configured to: set the second amount of regenerative braking torque to be higher than the first amount of regenerative braking torque when the current vehicle deceleration is lower than the target vehicle deceleration, and set the second amount of regenerative braking torque to be lower than the first amount of regenerative braking torque when the current vehicle deceleration is higher than the target vehicle deceleration.

EC(3) The system of EC(1) or EC(2), wherein the target vehicle deceleration is less than a threshold vehicle deceleration at which a brake light of the vehicle illuminates.

EC(4) The system of any one of EC(1) to EC(3), wherein the vehicle controller is further configured to command the regenerative braking subsystem to apply the first amount of regenerative braking torque responsive to receiving a control signal indicating a release of an accelerator pedal of the vehicle.

EC(5) The system of any one of EC(1) to EC(4), wherein the vehicle controller is further configured to determine the target vehicle deceleration based at least in part on a position of an accelerator pedal of the vehicle or a position of a brake pedal of the vehicle.

EC(6) The system of any one of EC(1) to EC(5), wherein the vehicle controller is further configured to determine the current vehicle deceleration based on a plurality of vehicle speed measurements.

EC(7) The system of any EC(6), further including one or more sensors positioned on the vehicle and configured to sense the plurality of vehicle speed measurements, wherein the one or more sensors including at least one selected from the group consisting of a wheel speed sensor, a motor speed sensor, and an engine speed sensor.

EC(8) A method for closed-loop control of regenerative braking in a vehicle, the method comprising: applying a first amount of regenerative braking torque with a regenerative braking subsystem of the vehicle; determining a current vehicle deceleration while the first amount of regenerative braking torque is applied; determining a difference between the current vehicle deceleration and a target vehicle deceleration; setting a second amount of regenerative braking torque to reduce the difference between the current vehicle deceleration and the target vehicle deceleration; and applying the second amount of regenerative braking torque with the regenerative braking subsystem.

EC(9) The method of EC(8), further comprising: setting the second amount of regenerative braking torque to be higher than the first amount of regenerative braking torque when the current vehicle deceleration is lower than the target vehicle deceleration, and setting the second amount of regenerative braking torque to be lower than the first amount of regenerative braking torque when the current vehicle deceleration is higher than the target vehicle deceleration.

EC(10) The method of one of EC(8) or EC(9), wherein the target vehicle deceleration is less than a threshold vehicle deceleration at which a brake light of the vehicle illuminates.

EC(11) The method of any one of EC(8) to EC(10), further comprising applying the first amount of regenerative braking torque with the regenerative braking subsystem responsive to receiving a control signal indicating a release of an accelerator pedal of the vehicle.

EC(12) The method of any one of EC (8) to EC(11), further comprising determining the target vehicle deceleration based on a vehicle speed measurement and a position of an accelerator pedal of the vehicle.

EC(13) The method of any one of EC(8) to EC(12), further comprising determining the current vehicle deceleration based on a plurality of vehicle speed measurements.

EC(14) A vehicle comprising: a regenerative braking subsystem; and a vehicle controller configured to: command the regenerative braking subsystem to apply a first amount of regenerative braking torque, determine a current vehicle deceleration while the first amount of regenerative braking torque is applied, determine a difference between the current vehicle deceleration and a target vehicle deceleration, set a second amount of regenerative braking torque to reduce the difference between the current vehicle deceleration and the target vehicle deceleration, and command the regenerative braking subsystem to apply the second amount of regenerative braking torque.

EC(15) The vehicle of EC(14), wherein the vehicle controller is further configured to: set the second amount of regenerative braking torque to be higher than the first amount of regenerative braking torque when the current vehicle deceleration is lower than the target vehicle deceleration, and set the second amount of regenerative braking torque to be lower than the first amount of regenerative braking torque when the current vehicle deceleration is higher than the target vehicle deceleration.

EC(16) The vehicle of EC(14) or EC(15), wherein the target vehicle deceleration is less than a threshold vehicle deceleration at which a brake light of the vehicle illuminates.

EC(17) The vehicle of any one of EC(14) to EC(16), wherein the vehicle controller is further configured to command the regenerative braking subsystem to apply the first amount of regenerative braking torque responsive to receiving a control signal indicating a release of an accelerator pedal of the vehicle.

EC(18) The vehicle of any one of EC(14) to EC(17), wherein the vehicle controller is further configured to determine the target vehicle deceleration based at least in part on a position of an accelerator pedal of the vehicle or a position of a brake pedal of the vehicle.

EC(19) The vehicle of any one of EC(14) to EC(18), wherein the vehicle controller is further configured to determine the current vehicle deceleration based on a plurality of vehicle speed measurements.

EC(20) The vehicle of EC(19), further including one or more sensors positioned on the vehicle and configured to sense the plurality of vehicle speed measurements, wherein the one or more sensors including at least one selected from the group consisting of a wheel speed sensor, a motor speed sensor, and an engine speed sensor.

In the foregoing specification, specific implementations have been described. However, one of ordinary skill in the art appreciates that various modifications and changes may be made without departing from the scope of the claims set forth below. Accordingly, the specification and figures are to be regarded in an illustrative rather than a restrictive sense, and all such modifications are intended to be included within the scope of the present disclosure.

It is to be understood that the phraseology and terminology used herein is for the purpose of description and should not be regarded as limiting. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software-based devices, as well as a plurality of different structural components may be utilized to implement the present disclosure. It should also be noted that a plurality of hardware and software-based devices, as well as a plurality of different structural components may be used to implement the present disclosure. In addition, it should be understood that implementations of the present disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software-based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (for example, a system bus) connecting the components.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Thus, the present disclosure provides, among other things, systems, methods, and vehicles for closed-loop control of regenerative braking. Various features and advantages are set forth in the following claims.

What is claimed is:

1. A system for closed-loop control of regenerative braking in a vehicle, the system comprising:
   a regenerative braking subsystem; and
   a vehicle controller configured to:
      command the regenerative braking subsystem to apply a first amount of regenerative braking torque,
      determine a current vehicle deceleration while the first amount of regenerative braking torque is applied,
      determine a target vehicle deceleration based on a vehicle speed measurement and a position of an accelerator pedal of the vehicle,
      determine a difference between the current vehicle deceleration and the target vehicle deceleration,
      set a second amount of regenerative braking torque to reduce the difference between the current vehicle deceleration and the target vehicle deceleration, and
      command the regenerative braking subsystem to apply the second amount of regenerative braking torque.

2. The system of claim 1, wherein the vehicle controller is further configured to:
set the second amount of regenerative braking torque to be higher than the first amount of regenerative braking torque when the current vehicle deceleration is lower than the target vehicle deceleration, and
set the second amount of regenerative braking torque to be lower than the first amount of regenerative braking torque when the current vehicle deceleration is higher than the target vehicle deceleration.

3. The system of claim 1, wherein the target vehicle deceleration is less than a threshold vehicle deceleration at which a brake light of the vehicle illuminates.

4. The system of claim 3, wherein the vehicle controller is further configured to command the regenerative braking subsystem to apply the first amount of regenerative braking torque responsive to receiving a control signal indicating a release of an accelerator pedal of the vehicle.

5. The system of claim 1, wherein the vehicle controller is further configured to determine the target vehicle deceleration based at least in part on a position of an accelerator pedal of the vehicle or a position of a brake pedal of the vehicle.

6. The system of claim 1, wherein the vehicle controller is further configured to determine the current vehicle deceleration based on a plurality of vehicle speed measurements.

7. The system of claim 6, further including one or more sensors positioned on the vehicle and configured to sense the plurality of vehicle speed measurements, wherein the one or more sensors including at least one selected from the group consisting of a wheel speed sensor, a motor speed sensor, and an engine speed sensor.

8. A method for closed-loop control of regenerative braking in a vehicle, the method comprising:
applying a first amount of regenerative braking torque with a regenerative braking subsystem of the vehicle;
determining a current vehicle deceleration while the first amount of regenerative braking torque is applied;
determining a target vehicle deceleration based on a vehicle speed measurement and a position of an accelerator pedal of the vehicle;
determining a difference between the current vehicle deceleration and the target vehicle deceleration;
setting a second amount of regenerative braking torque to reduce the difference between the current vehicle deceleration and the target vehicle deceleration; and
applying the second amount of regenerative braking torque with the regenerative braking subsystem.

9. The method of claim 8, further comprising:
setting the second amount of regenerative braking torque to be higher than the first amount of regenerative braking torque when the current vehicle deceleration is lower than the target vehicle deceleration, and
setting the second amount of regenerative braking torque to be lower than the first amount of regenerative braking torque when the current vehicle deceleration is higher than the target vehicle deceleration.

10. The method of claim 8, wherein the target vehicle deceleration is less than a threshold vehicle deceleration at which a brake light of the vehicle illuminates.

11. The method of claim 10, further comprising applying the first amount of regenerative braking torque with the regenerative braking subsystem responsive to receiving a control signal indicating a release of an accelerator pedal of the vehicle.

12. The method of claim 8, further comprising determining the current vehicle deceleration based on a plurality of vehicle speed measurements.

13. A vehicle comprising:
a regenerative braking subsystem; and
a vehicle controller configured to:
command the regenerative braking subsystem to apply a first amount of regenerative braking torque,
determine a current vehicle deceleration while the first amount of regenerative braking torque is applied,
determine a target vehicle deceleration based on a vehicle speed measurement and a position of an accelerator pedal of the vehicle,
determine a difference between the current vehicle deceleration and the target vehicle deceleration,
set a second amount of regenerative braking torque to reduce the difference between the current vehicle deceleration and the target vehicle deceleration, and
command the regenerative braking subsystem to apply the second amount of regenerative braking torque.

14. The vehicle of claim 13, wherein the vehicle controller is further configured to:
set the second amount of regenerative braking torque to be higher than the first amount of regenerative braking torque when the current vehicle deceleration is lower than the target vehicle deceleration, and
set the second amount of regenerative braking torque to be lower than the first amount of regenerative braking torque when the current vehicle deceleration is higher than the target vehicle deceleration.

15. The vehicle of claim 13, wherein the target vehicle deceleration is less than a threshold vehicle deceleration at which a brake light of the vehicle illuminates.

16. The vehicle of claim 15, wherein the vehicle controller is further configured to command the regenerative braking subsystem to apply the first amount of regenerative braking torque responsive to receiving a control signal indicating a release of an accelerator pedal of the vehicle.

17. The vehicle of claim 13, wherein the vehicle controller is further configured to determine the target vehicle deceleration based at least in part on a position of an accelerator pedal of the vehicle or a position of a brake pedal of the vehicle.

18. The vehicle of claim 13, wherein the vehicle controller is further configured to determine the current vehicle deceleration based on a plurality of vehicle speed measurements.

19. The vehicle of claim 18, further including one or more sensors positioned on the vehicle and configured to sense the plurality of vehicle speed measurements, wherein the one or more sensors including at least one selected from the group consisting of a wheel speed sensor, a motor speed sensor, and an engine speed sensor.

* * * * *